US012771922B2

(12) United States Patent
Krishnakumar et al.

(10) Patent No.: US 12,771,922 B2
(45) Date of Patent: Oct. 20, 2026

(54) SYSTEM AND METHOD FOR OPERATING A WEB CAMERA WITH AUTOMATED ANTI-REFLECTION ADJUSTABLE POLARIZER

(71) Applicant: Dell Products, LP, Round Rock, TX (US)

(72) Inventors: Karthikeyan Krishnakumar, Austin, TX (US); Hin Loong Justin Wong, Singapore (SG); Chien-Chih Liao, Taipei City (TW); Yi-Hsien Lin, Taipei City (TW)

(73) Assignee: DELL PRODUCTS LP, Round Rock, TX (US)

( * ) Notice: Subject to any disclaimer, the term of this patent is extended or adjusted under 35 U.S.C. 154(b) by 63 days.

(21) Appl. No.: 18/430,559

(22) Filed: Feb. 1, 2024

(65) Prior Publication Data

US 2025/0254414 A1 Aug. 7, 2025

(51) Int. Cl.

| | |
|---|---|
| ***H04N 23/55*** | (2023.01) |
| ***G02B 26/06*** | (2006.01) |
| ***H04N 23/52*** | (2023.01) |
| ***H04N 23/611*** | (2023.01) |
| ***H04N 23/69*** | (2023.01) |

(52) U.S. Cl.

CPC ........... *H04N 23/611* (2023.01); *G02B 26/06* (2013.01); *H04N 23/52* (2023.01); *H04N 23/55* (2023.01); *H04N 23/69* (2023.01)

(58) Field of Classification Search

CPC .......... H04N 23/55; H04N 7/142; G02B 5/30; G03B 21/604

USPC .......................................................... 348/335

See application file for complete search history.

(56) References Cited

U.S. PATENT DOCUMENTS

| | | | | |
|---|---|---|---|---|
| 5,208,624 A | | 5/1993 | Mackay | |
| 5,313,244 A | * | 5/1994 | Arai | G02B 7/08 396/132 |
| 5,652,921 A | * | 7/1997 | Kawano | G03B 7/095 396/132 |
| 8,588,605 B2 | | 11/2013 | Harris | |

(Continued)

FOREIGN PATENT DOCUMENTS

| | | | | |
|---|---|---|---|---|
| CN | 110119034 A | * | 8/2019 | G02B 27/281 |
| WO | 2013/148367 A1 | | 10/2013 | |

*Primary Examiner* — Anthony J Daniels

(74) *Attorney, Agent, or Firm* — Prol Intellectual Property Law, PLLC; H. Kenneth Prol

(57) ABSTRACT

A system and method or operating a webcam with an information handling system comprising a webcam microcontroller, a memory device, and a webcam camera to capture images of a user's face, an adjustable, automated polarizer device having a stepper motor and a polarizer in a gear polarizer ring operatively coupled by a drive gear and arranged in front of an aperture for the webcam camera where the polarizer in the gear polarizer ring is rotatable to adjust a polarizer rotation orientation to reduce reflection in the images captured by the webcam camera, and the webcam microcontroller to execute computer-readable program code of an automated polarizer control system to adjust the rotation of the polarizer with the stepper motor based on a detected head angle of the user's face in the images captured by the webcam camera to reduce reflection in the images.

20 Claims, 7 Drawing Sheets

(56) References Cited

U.S. PATENT DOCUMENTS

| | | | | |
|---|---|---|---|---|
| 8,774,619 | B2 | 7/2014 | Harris | |
| 8,976,465 | B2 | 3/2015 | Meng | |
| 2011/0037892 | A1 | 2/2011 | Hsu | |
| 2011/0223969 | A1 | 9/2011 | Chou | |
| 2016/0054538 | A1* | 2/2016 | Kawamura | G02B 7/10 359/825 |
| 2017/0068104 | A1 | 3/2017 | Ouderkirk | |
| 2018/0052332 | A1 | 2/2018 | Meng | |
| 2019/0149717 | A1* | 5/2019 | Overall | H04N 23/661 348/211.2 |
| 2019/0391357 | A1 | 12/2019 | Kobayashi | |
| 2021/0335013 | A1* | 10/2021 | Ma | G06F 17/16 |
| 2023/0154143 | A1 | 5/2023 | Taamazyan | |
| 2023/0272664 | A1* | 8/2023 | Pulikonda | F16D 7/00 701/49 |
| 2023/0379567 | A1* | 11/2023 | Schaefer | G03B 17/565 |

* cited by examiner

SYSTEM AND METHOD FOR OPERATING A WEB CAMERA WITH AUTOMATED ANTI-REFLECTION ADJUSTABLE POLARIZER

FIELD OF THE DISCLOSURE

The present disclosure generally relates to a web camera or webcam device. The present disclosure more specifically relates to a webcam device for use with an information handling system that includes an automated and adjustable polarizer lens and execution of code instructions for a automated polarizer control system for automatic anti-reflection control at the webcam device during use.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications, video conference applications, or work productivity applications. Further, the information handling system may include any number of peripheral devices including a web camera device, also referred to as a webcam, that may be external or internal to the information handling system and used to provide input to, such as capturing webcam images, or receive output from the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
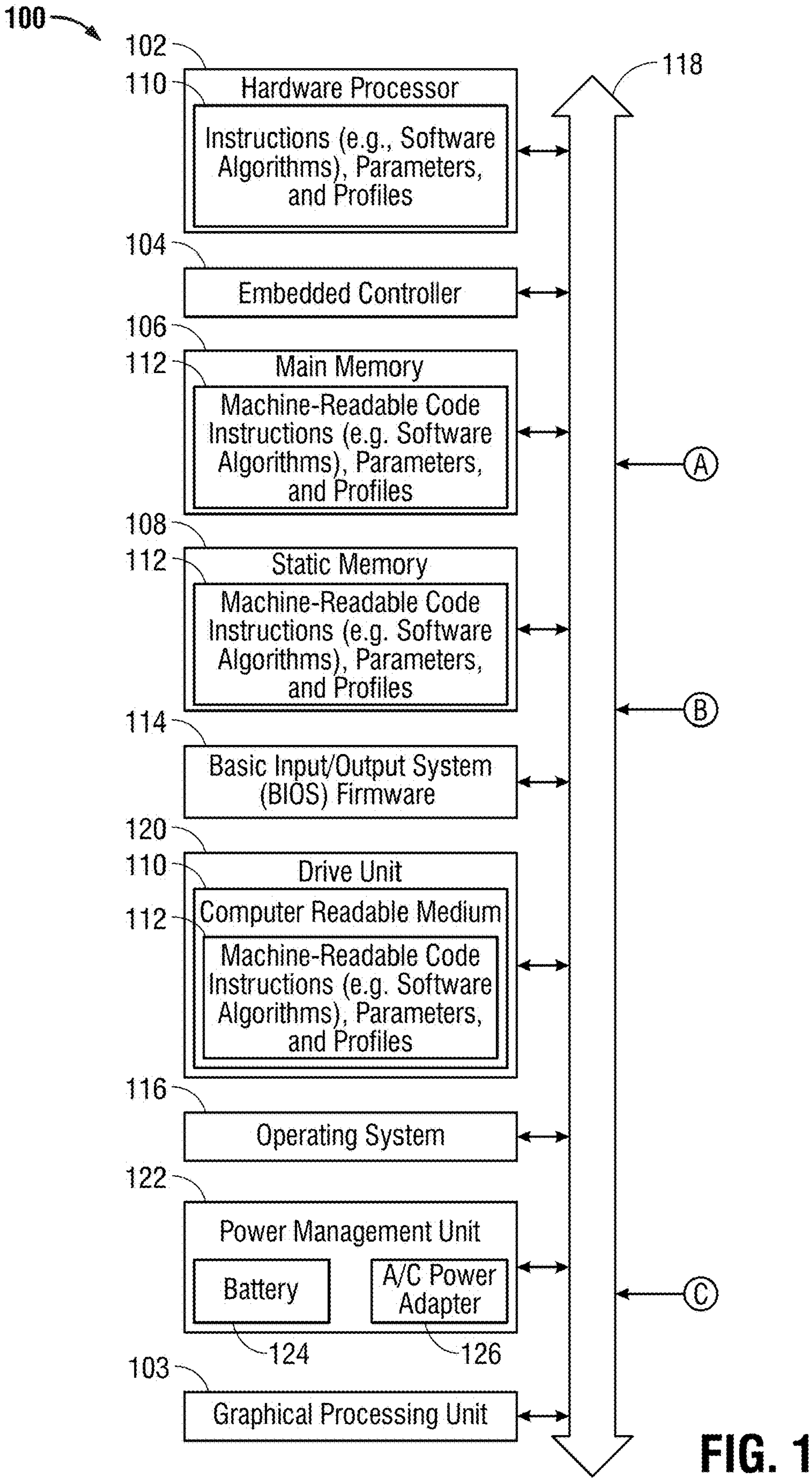
FIG. 1 is a block diagram illustrating an information handling system and a webcam with an adjustable, automated polarizer device according to an embodiment of the present disclosure.
Figure 1:
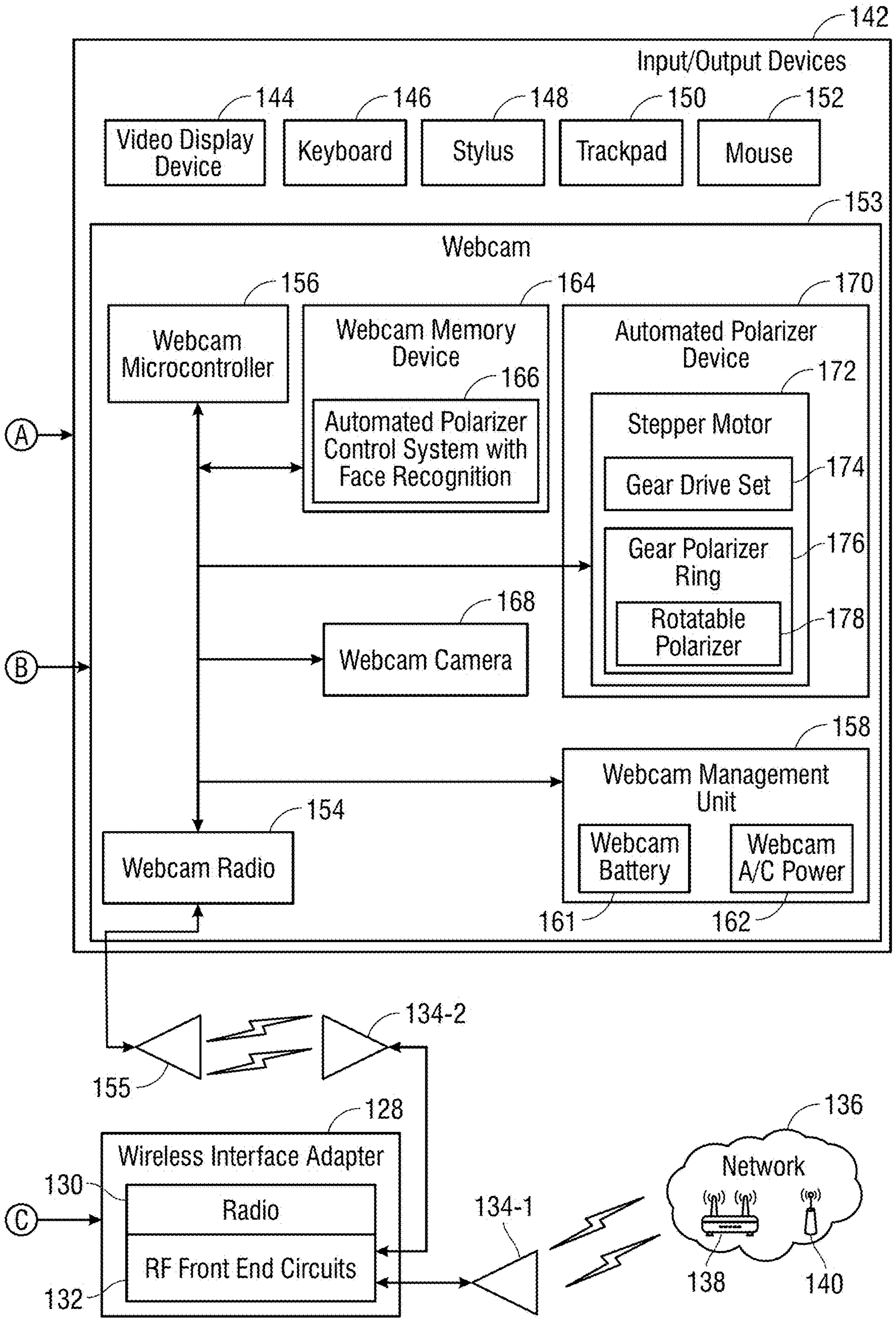

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to one or more input/output I/O devices that allow a user to interface with the information handling system. Some of these I/O devices may be wireless I/O devices that transceive data to and from the wireless I/O device. Some may be wired I/O devices. Specifically, a wired or wireless web camera device, also referred to as a webcam herein, may capture images for video streaming such as for during execution a videoconferencing application at an information handling system. The webcam captures the images, but some images may have lighting issues such as reflections off of a user's face or glasses on a user's face when a user appears in the captured images. Such reflection may be annoying or undesired during a videoconference. As a result, a static polarizer lens or shutter in an embodiment may be disposed in front of an aperture for the webcam camera in the webcam to cut down on the reflection or any glare in the captured images. However, as a user moves or turns her head during appearance before the webcam, a static polarizer cannot mitigate the reflection or glare in all head positions of the user. As a result, the reflections may appear and disappear as the user moves her head in different positions which is also an undesirable situation.

The present disclosure provides for an adjustable, automated polarizer device including a rotatable polarizer lens, also referred to as a rotatable polarizer, in a gear polarizer ring disposed across or in front of the aperture of the webcam camera such that it is rotatable according to embodiments herein. The rotatable polarizer may also work in conjunction with another static polarizer disposed across the aperture of the webcam camera as well. The rotatable polarizer may thus be rotated to mitigate the reflections in captured images of a user's face by the webcam camera as the user moves or changes head position in the captured images. As such, execution of code instructions of an automated polarizer control system by a webcam microcontroller for controlling the adjustable, automated polarizer device among a plurality of polarizer rotation orientations in the webcam for anti-reflection of a user's face in images operates to detect a user's face, the head position or face angle of the user's head, and to determine if any adjustments to the rotatable polarizer are warranted. The adjustable, automated polarizer device includes the rotatable polarizer in a gear polarizer ring rotatable with actuation of a stepper motor in an embodiment. The rotation of the rotatable polarizer is controllable with the stepper motor being operatively coupled to the gear polarizer ring via a drive gear set.

The execution of the code instructions of the automated polarizer control system by a webcam microcontroller may track the polarizer rotation orientation or position of rotation for the rotatable polarizer in an embodiment. Should the tracking of the polarizer rotation orientation get out of sync, it may be detected and reset by gear polarizer ring rotation to a rotation stop as detected by the stepper motor and the drive gear set operatively coupling the stepper motor to the gear polarizer ring in some embodiments. In this way, the adjustable, automated polarizer device including the rotatable polarizer lens in the gear polarizer ring may be operated under control of the webcam microcontroller in embodiments herein. The adjustable, automated polarizer device is used to adjust the polarization applied in front of the webcam camera to mitigate the reflections in captured images in real time when the user's head is an plural positions or plural head or face angles in front of the webcam camera according to embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports or wireless interface adapter 128 for communicating with external devices, as well as various input and output (I/O) devices 142, such as a web camera device or webcam 153 described in embodiments herein, a wired or wireless mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices

142 such as a webcam 153, a keyboard 146, a wired or wireless mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the webcam 153 described in embodiments herein that allow the user to interface with the information handling system 100 and via the video/graphics display device 144, a cursor control device (e.g., a trackpad 150 or mouse 152, or gesture or touch screen input), a stylus 148, and/or a keyboard 146, among others. Various drivers and control electronics may be operatively coupled to operate the I/O devices 142 according to the embodiments described herein. The present specification contemplates that the I/O devices 142 may be wired or wireless. In the context of the webcam 153 described herein, the wired or wireless webcam 153 in a wireless version is operatively coupled to the information handling system 100 via a wireless connection using a webcam radio 154 and webcam antenna 155. Alternatively, a webcam 153 and webcam controller 156 may be connected via a wired operative coupling with a network interface device supporting one or more port types or internal wired connections such as via "B" to a bus 118 of an information handling system 100.

A network interface device of the information handling system 100 may be wireless interface adapter 128 can provide connectivity among devices such as with Bluetooth® or to a network 136 or may be a wired network interface device for operative coupling to a network 136, e.g., a wide area network (WAN), a local area network (LAN), wireless local area network (WLAN), a wireless personal area network (WPAN), a wireless wide area network (WWAN), or other network. In embodiments described herein, the wireless interface device 128 with its radio 130, RF front end 132 and antenna 134-2 is used to communicate with the wireless version of mouse 152 via, for example, a Bluetooth® or Bluetooth® Low Energy (BLE) protocols at 2.4 GHz, 6 GHZ, or other frequencies. In an embodiment, the WAN, WWAN, LAN, and WLAN may each include an AP 138 or base station 140 or ethernet or other wired receiver used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100 via wireless coupling via antenna 134-1. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134-1, 134-2 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 or wired network interface device at "B" can represent an add-in card or wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device at "B" or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the wired version of mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a wired or wireless webcam 153. The wired or wireless webcam 153 may be used by a user to provide input to the information handling system 100 in the form of capturing images for video teleconference applications or other software applications by a webcam camera 168 as detected by an electronic camera sensor via a webcam camera aperture in embodiments herein. The wired or wireless webcam 153 may be used by a user to capture images of the user's image including the user's head and user's face when sitting before the webcam 153 and information handling system during execution of one or more applications such as a videoconferencing application in an embodiment.

According to embodiments herein, the webcam 153 during capture of images during videoconference or other applications may capture reflection or glare in the images in some aspects that may be problematic or undesirable. As a result, a static polarizer lens or shutter in an embodiment may be disposed in front of an aperture for the webcam camera 168 in the webcam to cut down on the reflection or any glare in the captured images. However, as a user moves or turns her head during appearance before the webcam 153, a static polarizer cannot mitigate the reflection or glare in all head positions of the user. As a result, the reflections may appear and disappear as the user moves her head in different positions which is also undesirable.

The present disclosure provides for an adjustable, automated polarizer device 170 including a rotatable polarizer 178 in a gear polarizer ring disposed across or in front of the aperture of the webcam camera 168 such that it is rotatable according to embodiments herein. The rotatable polarizer 178 may also work in conjunction with another static polarizer (not shown) disposed across the aperture of the webcam camera 168 as well in an embodiment. The rotatable polarizer 178 may thus be rotated to mitigate the reflections in captured images of a user's face by the webcam camera 168 as the user moves or changes head position in the captured images. As such, execution of code instructions of an automated polarizer control system 166 from a webcam memory device 164 by a webcam microcontroller 156 for controlling the adjustable, automated polarizer device 170 among a plurality of polarizer rotation orientations for the rotatable polarizer 178 in the webcam 153 for anti-reflection of a user's face in images. Execution of code instructions of an automated polarizer control system 166 by a webcam microcontroller 156 operates to detect a user's face, the head position or face angle of the user's head, and to determine if any adjustments to the rotatable polarizer 178 are warranted to mitigate the reflections in the images at those head positions or face angles. The adjustable, automated polarizer device 170 includes the rotatable polarizer 178 in a gear polarizer ring 176 rotatable with actuation of a stepper motor 172 in an embodiment. The rotation of the rotatable polarizer 178 is controllable with the stepper motor 172 being operatively coupled to the gear polarizer ring 176 via a drive gear set 174 in embodiments herein. The polarizer rotation orientation of rotatable polarizer 178 effective to mitigate reflections may be determined by execution of the code instructions of the automated polarizer control system 166 by a webcam microcontroller 156 with reference to a database via webcam memory device 164 having stored data relating to the same. In an example embodiment, a rotatable polarizer rotation look-up table may store a previously-determined correlation or a learned correlation between polarizer rotation orientation of the rotatable polarizer 178 and the detected user's head position or face angle, as determined from face landmarks detected by the automated polarizer control system 166 from the capture images by the webcam camera 168.

The execution of the code instructions of the automated polarizer control system 166 by a webcam microcontroller 156 may track the polarizer rotation orientation or position of rotation for the rotatable polarizer 178 in an embodiment. Should the tracking of the polarizer rotation orientation get out of sync, it may be detected and reset by gear polarizer ring 176 rotation to a rotation stop as detected by the stepper motor 172 and the drive gear set 174 operatively coupling the stepper motor 172 to the gear polarizer ring 176 in some embodiments. In this way, the adjustable, automated polarizer device 170 including the rotatable polarizer 178 in the gear polarizer ring 176 may be operated under control of the webcam microcontroller 156 in embodiments herein. The adjustable, automated polarizer device 170 is used to adjust the polarization applied in front of the webcam camera 168 to mitigate the reflections in captured images in real time when the user's head is a plurality of positions or at a plurality of face or head angles in front of the webcam camera 168 according to embodiments herein.

The wired or wireless webcam 153 further includes a webcam memory device 164. Webcam memory device 164 may include a database for a rules table or other form of addressable data for the rotatable polarizer rotation look-up table or correlation data between the rotatable polarizer orientation and the head position or face angle of a user in captured images. The mouse memory device 164 may also be used to store computer readable code instruction, such as firmware or software, of the automated polarizer control system 166 as well as any data used by the webcam microcontroller 156 to execute the systems and methods described herein.

The webcam 153 also includes a webcam PMU 158. The webcam PMU 158 may include a hardware controller and executable machine-readable code instructions to manage the power provided to the components of the webcam 153 such as the webcam microcontroller 156, the webcam camera 168, the webcam memory device 164, the webcam radio 154, the adjustable, automated polarizer device 170 including its stepper motor 172, and other hardware components described in various embodiments herein. In an embodiment, the webcam PMU 158 may monitor power levels and be electrically coupled within the webcam 153 to provide this power.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2B:
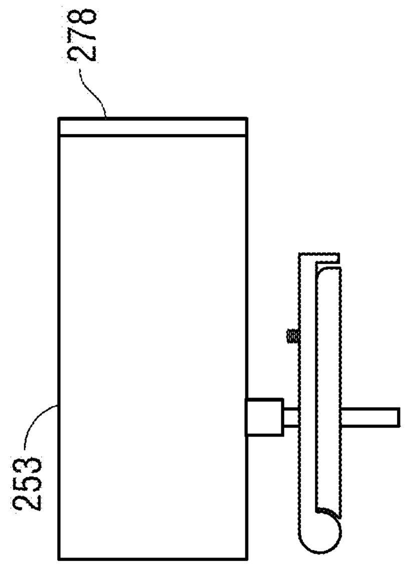
FIG. 2B is a perspective close up side view of the webcam with the adjustable, automated polarizer device according to an embodiment of the present disclosure.
Figure 2A:
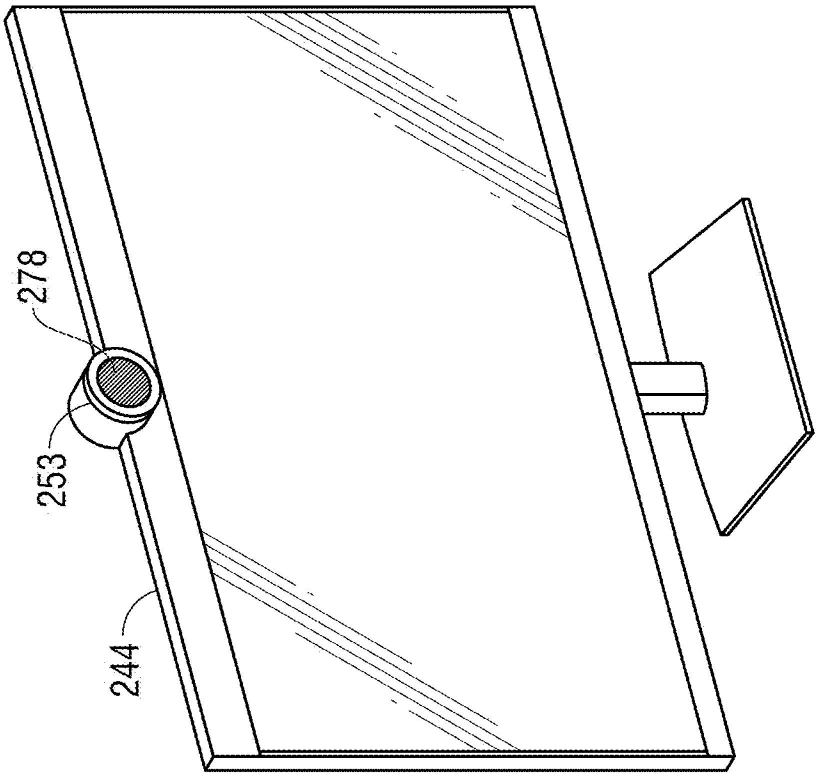
FIG. 2A is a perspective view of an information handling system display with a webcam according to an embodiment of the present disclosure.

FIG. 2A is a perspective view of an information handling system display 244 with a webcam 253 according to an embodiment of the present disclosure. Additionally, FIG. 2B is a perspective close up, side view of the webcam 253 with the adjustable, automated polarizer device 278 according to an embodiment of the present disclosure. As described herein, the present disclosure provides for an adjustable, automated polarizer device including a rotatable polarizer in a gear polarizer ring disposed across or in front of the aperture of the webcam camera of the webcam 253 such that it is rotatable according to embodiments herein. In an embodiment, the automated polarizer device 278 may actively cut down on the reflection or any glare in the images of a user captured by the webcam 253, including in those situations where the reflection or glare occurs and in those situations where the user turns her head during her appearance before the webcam 253 changing the location or angle of the reflection or glare.

It is appreciated that, although FIG. 2A shows a single information handling system display 244, the present specification contemplates the use by a user of one or more additional information handling system displays 244 situated at the side of the information handling system display 244 shown. These additional information handling system displays 244 may help to extend the available desktop space available to the user to interface with the information handling system. However, as described herein, the user may turn her head in the direction of these additional information handling system displays 244 (e.g., turning head to the right or left) causing reflection or glare on the user's face, features, and/or eyeglasses (where worn) to move or shift angles of light. For example, a blue light glare or reflected image off of the user's eyeglasses is included in the images captured by the webcam 253 may be problematic and may move with movement or turning of the user's face or head. The automated polarizer device 278 described herein, mitigates the reflections in captured images of a user's face by the webcam camera of the webcam 253 as the user moves or changes head position in the captured images while viewing the information handling system display 244 and any additional information handling system displays 244.

Figure 3A:
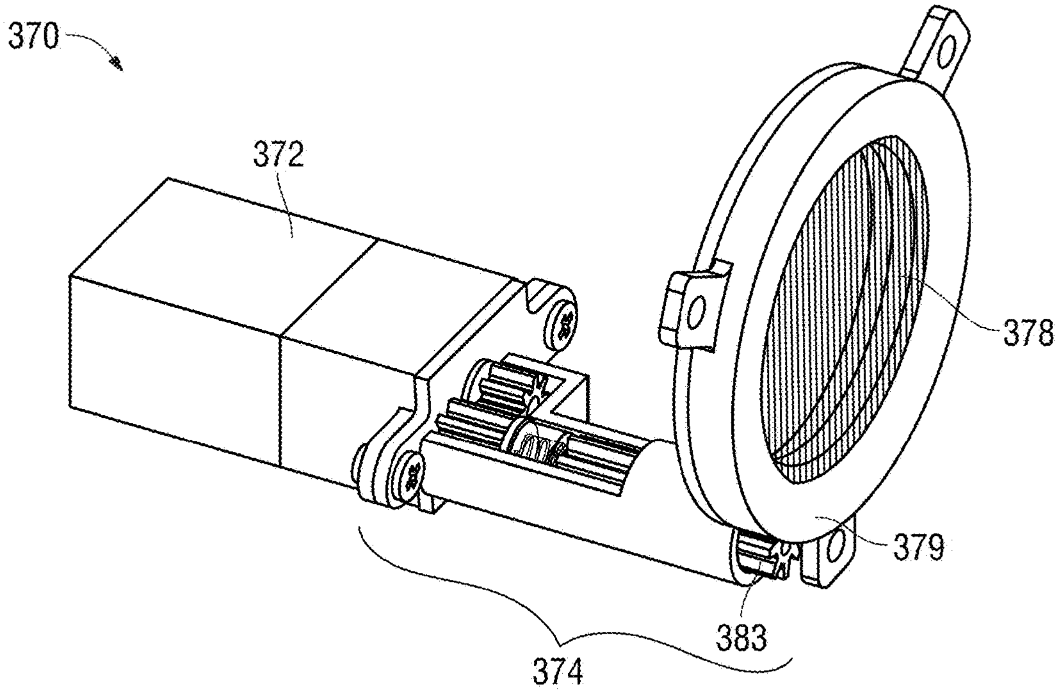
FIG. 3A is a perspective view of the adjustable, automated polarizer device according to an embodiment of the present disclosure.
Figure 3B:
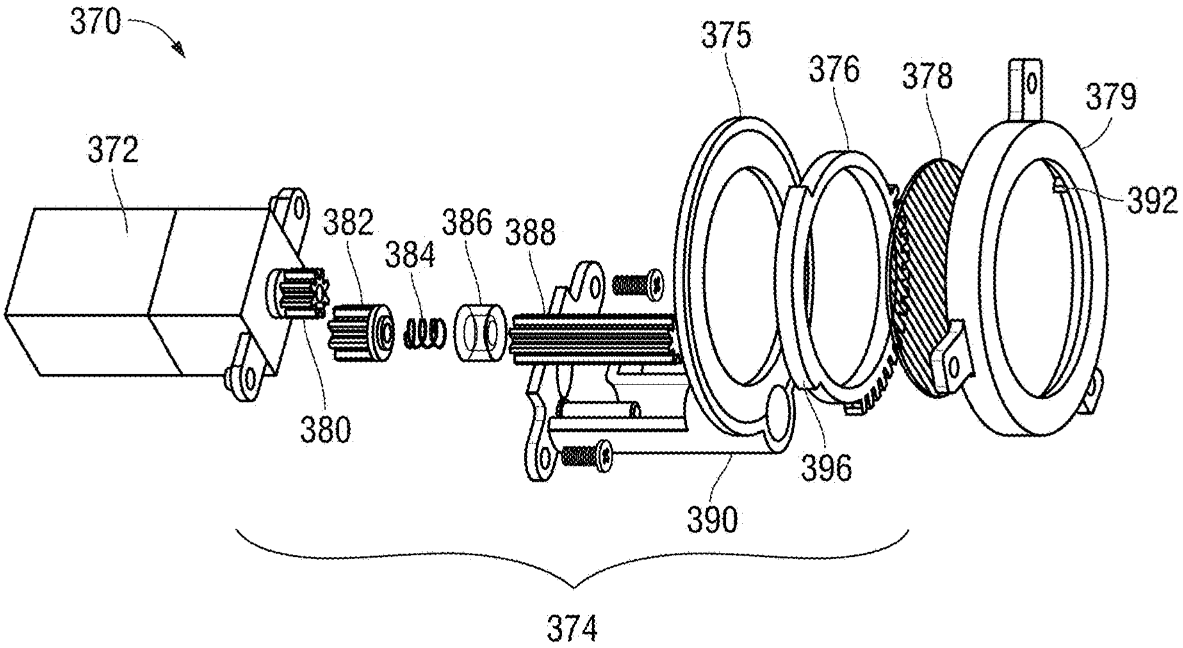
FIG. 3B is exploded, perspective view of the adjustable, automated polarizer device according to an embodiment of the present disclosure.

FIG. 3A is a perspective view of the adjustable, automated polarizer device 370 according to an embodiment of the present disclosure. Additionally, FIG. 3B is an exploded perspective view of the adjustable, automated polarizer device 370 according to an embodiment of the present disclosure. As described herein, the automated polarizer device 370 may form part of a wired or wireless webcam operatively coupled to the information handling system such as that described in FIG. 1. In an embodiment, the automated polarizer device 370 includes a rotatable polarizer 378 that is placed in front of a webcam camera such that light is passed through the rotatable polarizer 378 prior to reaching the aperture of the webcam camera.

In an embodiment, the automated polarizer device 370 includes a stepper motor 372. A stepper motor 372 may include any electrical motor that is capable of rotating a shaft in a series of incremented angular steps such that, in the embodiments herein, the rotational angle of the rotatable polarizer 378 may be placed at predetermined angles (e.g., 0-degrees, 45-degrees, 90-degrees). The stepper motor 372 may be operatively coupled to a gear drive set 374 that allows the rotation of a shaft of the stepper motor 372 to be translated into the rotational movement of the rotatable polarizer 378 held by a gear polarizer ring 376 as described herein. In the embodiment shown in FIG. 3B, for example, the gear drive set 374 may include a stepper motor shaft gear 380 that is operatively coupled to the shaft of the stepper motor 372. The gear drive set 374 further includes an idle gear 382 whose teeth mesh with the teeth of the stepper motor shaft gear 380. In an embodiment, the idle gear may have an axis that is offset from the axis of the stepper motor shaft gear 380. This offsetting of the idle gear 382 relative to the stepper motor shaft gear 380 may allow other gears of the gear drive set 374 to interface with an outer side gear of a gear polarizer ring 376 that holds the rotatable polarizer 378 described herein.

In an embodiment, the gear drive set 374 further includes a clutch 386 and clutch spring 384 and a drive gear 388 operatively coupled to the idle gear 382. In an embodiment, an axis of the clutch 386 may be aligned with the axis of the idle gear 382 and the drive gear 388. Still further, the clutch 386 may include a clutch spring 384 that applies a force against the idle gear 382 and an interior portion of the clutch 386 such that the clutch 386 is pressed against the drive gear 388 and is allowed to slip when the drive gear 388 is prevented from rotating further in some scenarios described herein.

In an embodiment, the drive gear 388 is operatively coupled to the clutch 386 and placed within a drive gear tube 390. The drive gear tube 390, in an embodiment, forms a monolithic piece with an exterior cover ring 375 used to hold the drive gear 388 in place relative to a gear polarizer ring 376. In an embodiment, the exterior cover ring 375 holds both the gear polarizer ring 376 and rotatable polarizer 378 in place be being operatively coupled to an exterior holder ring 379. A space is formed between the exterior cover ring 375 and exterior holder ring 379 such that the gear polarizer ring 376 and rotatable polarizer 378 may rotate according to the rotation of the drive gear 388 as described herein. In an embodiment, the exterior cover ring 375 and/or exterior holder ring 379 may include a recess into which the gear polarizer ring 376 may be placed to secure the gear polarizer ring 376 between the exterior cover ring 375 and exterior holder ring 379. In an embodiment, the drive gear tube 390 and exterior cover ring 375 may be operatively coupled to the stepper motor 372 via one or more fasteners such as screws or bolts.

During operation, the rotatable polarizer 378 may be rotated to mitigate the reflections in captured images of a user's face by the webcam camera (not shown) as the user moves or changes head position in the captured images. As such, execution of code instructions of an automated polarizer control system (not shown) from a webcam memory device by a webcam microcontroller controls the adjustable, automated polarizer device 370 to rotate the rotatable polarizer 378 at a plurality of polarizer rotation orientations for anti-reflection of a user's face in captured images. Execution of code instructions of an automated polarizer control system, including using facial recognition software, by a webcam microcontroller operates to detect a user's face, the head position or face angle of the user's head, and to determine if any adjustments to the rotatable polarizer 378 are warranted to mitigate the reflections in the images at those head positions or face angles.

When reflections (e.g., blue light) are detected or a head or face angle is detected that indicate that reflections may be viewable in the captured image with the rotatable polarizer in its current rotational orientation, the stepper motor 372 may be activated to cause the rotation of the rotatable polarizer 378. Because the stepper motor 372 is operatively coupled to the gear polarizer ring 376 via a drive gear set 374, the rotatable polarizer 378 may be rotated to mitigate these reflections. In an embodiment, the polarizer rotation orientation of rotatable polarizer 378 effective to mitigate the reflections at the user's face may be determined by execution of the code instructions of the automated polarizer control system by a webcam microcontroller with reference to a database via webcam memory device having stored data relating to the same. In an example embodiment, a rotatable polarizer rotation look-up table may store a correlation between polarizer rotation orientation of the rotatable polarizer 378 and the detected user's head position or face angle, as determined from face landmarks detected by the automated polarizer control system from the capture images by the webcam camera. An example look-up table may include the following table (Table 1) may have been generated from testing of a webcam or from artificial intelligence learning algorithms that shows potential example scenarios where a user's face position is detected and determined outcomes related to the rotational position of the rotatable polarizer 378:

TABLE 1

| Polarizer Rotational Angle | Face detected left | Face straight | Face detected Right |
|---|---|---|---|
| 0-degrees | Blue reflection | Blue reflection | No reflection |
| 45-degrees | Blue reflected | No reflection | No data detected |
| 90-degrees | No reflection | Blue reflected | Blue reflected |
| Polarizer final position determination | 90-degrees | 45-degrees | 45-degrees |

head is an any position or at any angle in front of the webcam camera 168 according to embodiments herein. The webcam microcontroller may reference the created look-up table (e.g., table 1) when performing subsequent actions to mitigate reflections from the user's face and/or eyeglasses.

For example, where the user's face is detected to be facing left, the rotational movement of the rotatable polarizer 378 may be conducted to determine the optimal rotational angle of the rotatable polarizer 378 in order to mitigate or eliminate reflections. It is appreciated that the direction of the user's face may be detected by executing computer-readable program code of facial recognition software of the automated polarizer control system described herein that detects movement of landmarks on the user's face such as a chin, eyeglasses, a nose, cheeks, eyes, eyebrows, and/or ears in order to determine if the user is facing straight into the camera, facing left, or facing right. By first detecting the position of the user's face, the execution of the computer-readable program code of the automated polarizer control system allows the webcam microcontroller to determine whether blue light is being reflected from the user's face and/or eyeglasses to the webcam or not. An example operation of the stepper motor 372 and rotatable polarizer 378 may include detecting an initial position of the rotatable polarizer 378 being 0-degrees and, at that rotational angle, the webcam microcontroller determining that blue light is being reflected at that rotational angle of the rotatable polarizer 378. The stepper motor 372 may then be activated to determine if a 45-degree rotation of the rotatable polarizer 378 produces no detectable reflections. Table 1, however, indicates that blue light reflection is detected at that 45-degree rotational angle of the rotatable polarizer 378. As such, the stepper motor 372 may again be activated to rotate the rotatable polarizer 378 another 45-degrees resulting in a total degree of rotation at 90-degrees. At this rotational angle of the rotatable polarizer 378, the webcam microcontroller executing the computer-readable program code of the automated polarizer control system detects no reflected blue light. As such, the determined final rotational angle of the rotatable polarizer 378 when the user's face is detected to be facing left and reflections are not detected is determined to be 90-degrees.

In an embodiment, the execution of the automated polarizer control system by the webcam microcontroller may perform similar processes when the user's face is facing right and straight into the webcam camera such that all or most angles of the user's face and associated blue light reflection values are detected in order to create the look-up table (e.g., table 1) described herein. In this way, the adjustable, automated polarizer device 370 including the rotatable polarizer 378 in the gear polarizer ring 376 may be operated under control of the webcam microcontroller as described in embodiments herein. The adjustable, automated polarizer device 370 is used to adjust the polarization applied in front of the webcam camera to mitigate the reflections in captured images in real time when the user's head is an any position or at any angle in front of the webcam camera 168 according to embodiments herein.

In an embodiment, the execution of the code instructions of the automated polarizer control system by the webcam microcontroller may also track the rotational orientation or position of rotation for the rotatable polarizer 378 during operation in an embodiment. Should the tracking of the polarizer rotation orientation get out of sync, it may be detected and reset by the gear polarizer ring 376 rotation to a rotation stop as detected by the stepper motor 372 and the drive gear set 374 operatively coupling the stepper motor 372 to the gear polarizer ring 376 in some embodiments. In an embodiment, the exterior holder ring 379 may include one or more stops 392 formed at an interior surface of the exterior holder ring 379 and/or exterior cover ring 375. These stops 392 may interface with a stopper shelf 396 formed on an external surface of the gear polarizer ring 376 such that each of the stops 392 prevents the rotation of the gear polarizer ring 376 by the stepper motor 372 and gear drive set 374. In an embodiment, the stepper motor 372 may attempt to rotate the gear polarizer ring 376 and rotatable polarizer 378 beyond the 0-degree angle and 90-degree angle. When this happens, the physical contact of the stopper shelf 396 against the stops 392 prevents the gear polarizer ring 376 and rotatable polarizer 378 from rotating further while the clutch 386 is allowed to slip against a back surface of the drive gear 388. The stepper motor 372 may reset the rotational angle of the gear polarizer ring 376 and rotatable polarizer 378 by, periodically, attempting to rotate the gear polarizer ring 376 and rotatable polarizer 378 beyond the 0-degree or 90-degrees. This resetting process causes the stopper shelf 396 to stop the rotation of the gear polarizer ring 376 and rotatable polarizer 378 at a certain extreme degree while the clutch 386 is allowed to rotate freely due to the resistance of rotation at the drive gear 388. The stepper motor 372 may stop rotation after a period of time and indicate to the webcam microcontroller that the rotational angle of the gear polarizer ring 376 and rotatable polarizer 378 have been reset and report the current rotational angle of the gear polarizer ring 376 and rotatable polarizer 378 (e.g., 0-degrees or 90-degrees).

The rotatable polarizer 378 may also work in conjunction with another static polarizer (not shown) disposed across the aperture of the webcam camera as well in an embodiment. In this embodiment, the static polarizer may be fixed to an interior surface of the exterior holder ring 379 and in front of the rotatable polarizer 378. As the rotatable polarizer 378 is caused to rotate as described herein, the polarization properties of the static polarizer and rotatable polarizer 378 may be used to create a shutter that block all or most light entering the webcam when the polarizers are orthogonal to each other (e.g., crossed polarizers).

Figure 4:
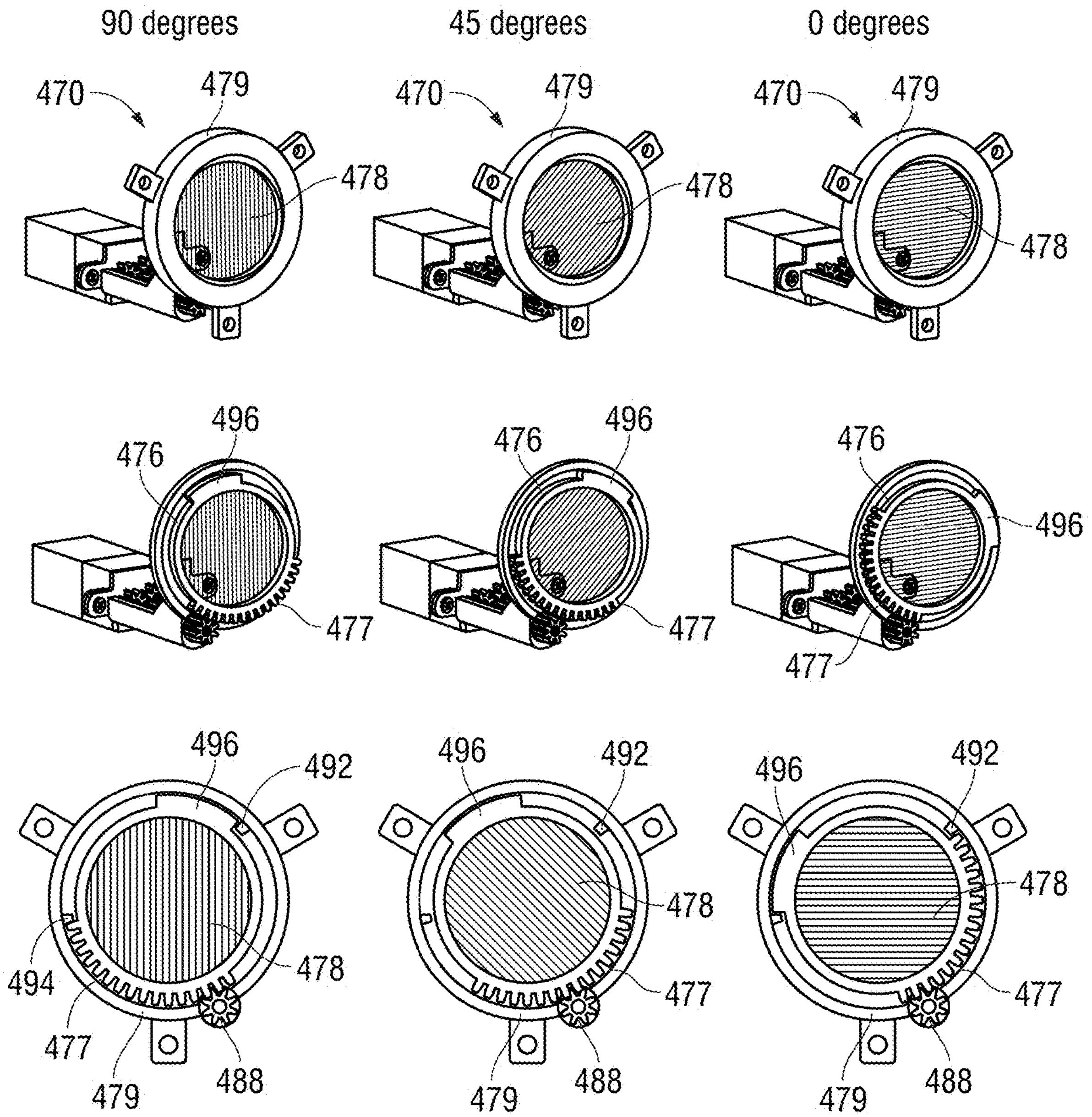
FIG. 4 is an array of perspective and front views of the adjustable, automated polarizer device in a plurality of polarizer rotation orientations according to an embodiment of the present disclosure.

FIG. 4 is an array of perspective and front views of the adjustable, automated polarizer device 470 in a plurality of polarizer rotation orientations according to an embodiment of the present disclosure. FIG. 4 shows three columns that include the rotatable polarizer 478 in a 90-degree rotational angle in the first column, the rotatable polarizer 478 in a 45-degree rotational angle in the second column, and the rotatable polarizer 478 in a 0-degree rotational angle in the third column, respectively. Each of these orientations have a perspective view of the automated polarizer device 470, another perspective view of the automated polarizer device 470 with an exterior holder ring 479 being removed, and a front view of the gear polarizer ring 476 and rotatable polarizer 478 relative to a drive gear 488 of the drive gear 488 of the drive gear set described herein in FIG. 3.

In the first column of images in FIG. 4, the rotatable polarizer 478 and gear polarizer ring 476 is shown to be in a 90-degree orientation. This orientation of the rotatable polarizer 478 and gear polarizer ring 476 shows that the gear polarizer ring 476 and the operatively-coupled rotatable polarizer 478 have been rotated in an extreme clockwise direction. Indeed, in this image, further clockwise rotation of the gear polarizer ring 476 is prevented due to the stopper shelf 496 of the gear polarizer ring 476 coming into contact with a first stop 492 formed into the exterior cover ring (e.g., FIG. 3, 375) and/or exterior holder ring 479. FIG. 4 further shows a side gear teeth 477 formed on an outside circumference surface of the gear polarizer ring 476 that interfaces with the drive gear 488 that forms part of the drive gear set described herein and shown in more detail in FIG. 3. As described herein, rotation of the drive gear 488 causes the rotation of the gear polarizer ring 476 and operatively-coupled rotatable polarizer 478 in various rotational angles including the 90-degree angle shown in this first column of images in FIG. 4.

The second column of images shows the automated polarizer device 470 with the gear polarizer ring 476 and rotatable polarizer 478 placed in a 45-degree rotational angle. As seen in this column of images, the stopper shelf 496 formed along an outer edge of the gear polarizer ring 476 is now in between the first stop 492 and a second stop 494 each formed into the exterior cover ring (e.g., FIG. 3, 375) and/or exterior holder ring 479. Again, the rotation of the drive gear 488 by operation of the stepper motor as directed by the webcam microcontroller causes the gear polarizer ring 476 to be rotated into this position as shown in this second column of images of the automated polarizer device 470.

A third column of images in FIG. 4 show the rotatable polarizer 478 and gear polarizer ring 476 to be in a 0-degree orientation. This orientation of the rotatable polarizer 478 and gear polarizer ring 476 shows that the gear polarizer ring 476 and the operatively-coupled rotatable polarizer 478 have been rotated in an extreme counter-clockwise direction. Indeed, in this image, further counter-clockwise rotation of the gear polarizer ring 476 is prevented due to the stopper shelf 496 of the gear polarizer ring 476 coming into contact with a second stop 494 formed into the exterior cover ring (e.g., FIG. 3, 375) and/or exterior holder ring 479. Again, FIG. 4 further shows a set of side gear teeth 477 formed on an outside surface of the gear polarizer ring 476 that interfaces with the drive gear 488 that forms part of the drive gear set described herein and shown in more detail in FIG. 3. As described herein, rotation of the drive gear 488 causes the rotation of the gear polarizer ring 476 and operatively-coupled rotatable polarizer 478 in various rotational angles including the 90-degree angle shown in this first column of images.

It is appreciated that the first stop 492 and/or second stop 494 may be used to reset the tracking, by the webcam microcontroller, of the rotational angle of the gear polarizer ring 476 and operatively-coupled rotatable polarizer 478. Should the tracking of the polarizer rotation orientation get out of sync, the rotational angle of the gear polarizer ring 476 may be detected and reset by the gear polarizer ring 476 rotation to one of the first stop 492 or second stop 494 as detected during operation of the stepper motor and the drive gear set operatively coupling the stepper motor to the gear polarizer ring 476 in some embodiments. In an embodiment, the exterior holder ring 479 including the first stop 492 and second stop 494 formed at an interior surface of the exterior holder ring 479 and/or exterior cover ring 475 may be deliberately caused to interface with a stopper shelf 496 such that either of the first stop 492 or second stop 494 prevents the rotation of the gear polarizer ring 476 by the stepper motor and the gear drive set experiences slippage at a clutch as described in FIG. 3. In an embodiment, the stepper motor may attempt to rotate the gear polarizer ring 476 and rotatable polarizer 478 beyond the 0-degree angle or 90-degree angle to set or reset the polarizer rotation orientation. When this happens, the physical contact of the stopper shelf 496 against one of the first stop 492 and second stop 494 prevents the gear polarizer ring 476 and rotatable polarizer 478 from rotating further while the clutch within the drive gear set is allowed to slip against a back surface of the drive gear 488. The stepper motor may thus reset the rotational angle of the polarizer rotational orientation of the gear polarizer ring 476 and rotatable polarizer 478 by, periodically, attempting to rotate the gear polarizer ring 476 and rotatable polarizer 478 beyond the 0-degree or 90-degree rotational angle. This resetting process causes the stopper shelf 496 to stop the rotation of the gear polarizer ring 476 and rotatable polarizer 478 at a certain extreme degree while the clutch is allowed to rotate freely due to the resistance of rotation at the drive gear 488. The stepper motor may stop rotation after a period of time and indicate to the webcam microcontroller that the rotational angle of the gear polarizer ring 476 and rotatable polarizer 478 have been reset and report the current rotational angle of the gear polarizer ring 476 and rotatable polarizer 478 (e.g., 0 degrees or 90 degrees).

Figure 5:
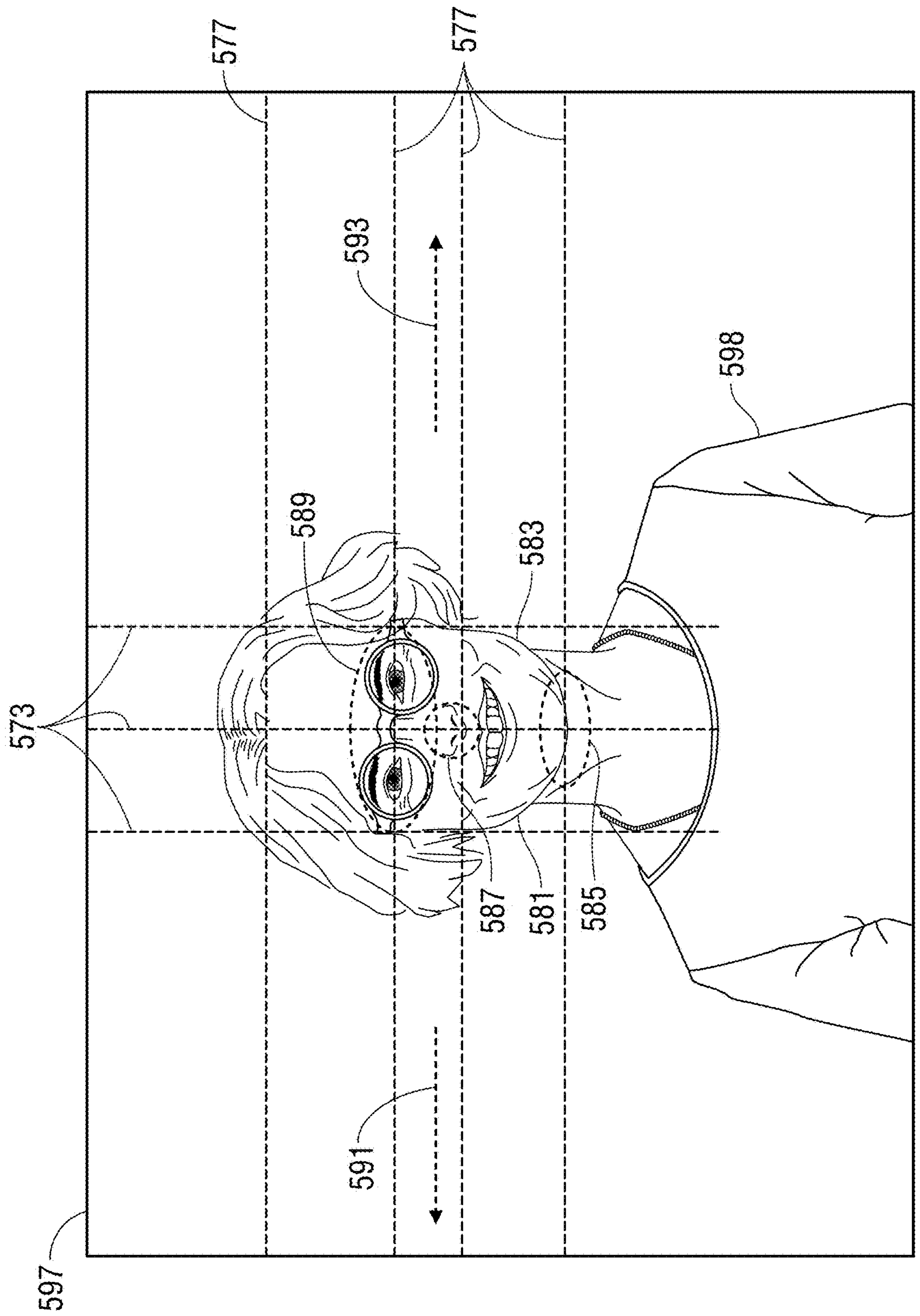
FIG. 5 is a graphical diagram of an image of a user's head in an image captured by a webcam showing a head or face angle and face landmarks according to an embodiment of the present disclosure.

FIG. 5 is an image 597 depicting a user 598 as captured by a webcam that includes a plurality of face landmarks 585, 587, 589 used by an automated polarizer control system with face recognition to determine an orientation of the user's 598 face according to an embodiment of the present disclosure. As described herein, the execution of the automated polarizer control system with face recognition at a webcam microcontroller may execute an algorithm, such as a trained artificial intelligence algorithm, to first detect the user's face and identify certain face landmarks 585, 587, and 589 as shown in FIG. 5. Facial landmarks such as eyeglasses or eyes 589, nose 587, chin 585 or other such as ears, hair perimeter, forehead, cheeks or eyebrows may also be facial landmarks identified by the facial recognition algorithms in order to determine head angle or face angle of the user's head or face in image 597. For example, execution of code instructions of the automated polarizer control system with face recognition at the webcam microcontroller may periodically scan one or more captured images 597 to whether a determine a face or head angle falls into a face angle range indicative of the user 598 is looking straight into the webcam as shown in FIG. 5, indicative of the user 598 looking to the left in the direction of the left vector line 591 and left of the center line, or indicative of the user 598 looking to the right in the direction of the right vector line 593 and right of the center line. In an embodiment, the first face landmark 585 may include a user's 598 chin. The first face landmark 585 may be identifiable when the webcam microcontroller executes the facial recognition software associated with the automated polarizer control system with face recognition as described herein. Still further, the second face landmark 587 include a user's 598 nose. Still further, the third face landmark 589 may include a user's 598 eyes and/or eyeglasses. It is appreciated that, although only three face landmarks 585, 587, 589 are shown to be determined in FIG. 5, the present specification contemplates that other landmarks may also be determined during this facial recognition process.

In an embodiment, the execution of the automated polarizer control system with face recognition may cause the webcam microcontroller to detect profile lines at the sides of the user's 598 face. As shown in FIG. 5 for example, a left cheek profile line 581 and right cheek profile line 583 have been identified by operation of the facial recognition software. Changes in these profile lines 581, 583 may indicate the user 598 is turning her head to the left or right. For example, where the left cheek profile line 581 changes in location relative to a center facial landmark such as 587 or 585, the facial recognition software may detect that the user 598 is turning her head to the left as indicated by the left vector line 591. It is also appreciated that other profile lines may be detected at, for example, a user's ears (where viewable by the webcam) such that disappearing of these profile lines indicates to the webcam microcontroller that the user 598 is turning her head.

As shown in FIG. 5, the execution of the automated polarizer control system with face recognition may also identify vertical proportion lines 573 and horizontal proportion lines 577. Similar to the left cheek profile line 581 and right cheek profile line 583, the vertical proportion lines 573 may be identified by the facial recognition software and used to determine if the user 598 has turned hear head left or right as indicated by the left vector line 591 and right vector line 593, respectively. The vertical proportion lines 573 may be defined by the detected proportions of the user's 598 face across the vertical proportion lines 573. For example, a vertical proportion line 573 may be placed at a leftmost side of the user's 598 face and a rightmost side of the user's 598 face. These two vertical proportion lines 573 allow the facial recognition software to, by detected proportion also find a centerline of the user's face. Using the face landmarks 585, 587, 589 and the distances between them, the distance between these vertical proportion lines 573 may change as the user 598 turns left or right allowing the webcam microcontroller to determine if the user is looking left or right.

Similarly, the horizontal proportion lines 577 also be placed at identifiable locations on the users face which, in the example embodiment in FIG. 5, includes a topmost edge of the user's 598 face, a bottommost edge of the user's 598 face, a bottommost edge of the user's 598 nose, and a horizontal centerline of the user's 598 eyes and/or eyeglasses. Again, as the user looks up or down, the distances between each of these horizontal proportion lines 577 may change indicating to the webcam microcontroller that the user is looking up or down. It is appreciated that more or fewer vertical proportion lines 573 and horizontal proportion lines 577 may be used by the facial recognition software to determine the orientation of the user's 598 face as the webcam is capturing video images of the user's 598 face. It is also appreciated that other locations of the vertical proportion lines 573 and horizontal proportion lines 577 may be selected and the placement of the vertical proportion lines 573 and horizontal proportion lines 577 in FIG. 5 are merely examples.

As described herein, the face landmarks 585, 587, 589, the profile lines 581, 583, the vertical proportion lines 573, and the horizontal proportion lines 577 may all be used by the webcam microcontroller to determine the orientation angle of the user's 598 face or head. With this face or head angle, execution of code instructions of the automated polarizer control system with face recognition may thereby determine a range of head or face angles left to right or up to down and use it with tracked polarizer rotation orientation correlate whether to change the polarizer rotation orientation of the rotatable polarizer via the gear polarizer ring to mitigate reflection or glare of in the images 597 of the user 598 as described herein. As described herein, the rotatable polarizer may be rotated to mitigate the reflections from the user's 598 face and/or eyeglasses 589 in captured images 597 of a user's face by the webcam camera as the user moves or changes head position in the captured images in real time or near real time with periodic sampling of the user's head or face angles. As such, execution of code instructions of an automated polarizer control system from a webcam memory device by a webcam microcontroller controls the adjustable, automated polarizer device among a plurality of polarizer rotation orientations for the rotatable polarizer in the webcam for anti-reflection of a user's face in images. Execution of code instructions of an automated polarizer control system by a webcam microcontroller operates to detect a user's face, the head position or face angle of the user's head as described in FIG. 5, and to determine if any adjustments to the rotatable polarizer are warranted to mitigate the reflections in the images 597 at those head positions or face angles. The polarizer rotation orientation of rotatable polarizer effective to mitigate reflections may be determined by execution of the code instructions of the automated polarizer control system by a webcam microcontroller with reference to a database via webcam memory device having stored data relating correlating the same. In an example embodiment, a rotatable polarizer rotation look-up table may store a correlation between polarizer rotation orientation of the rotatable polarizer and the detected user's head position or face angle in mitigation of reflection or glare, as determined from face landmarks detected by the automated polarizer control system from the captured images 597 by the webcam camera.

Figure 6:
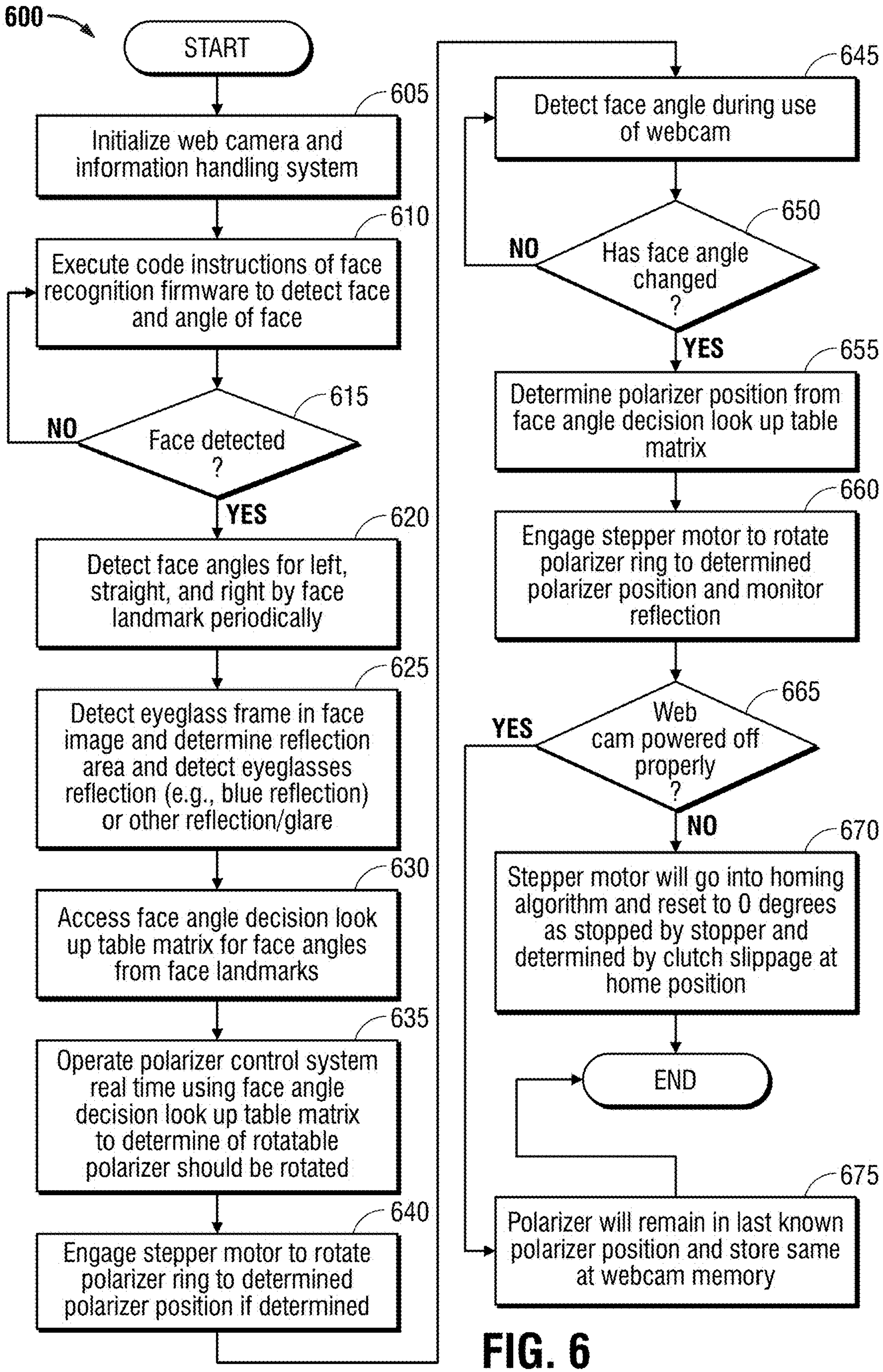
FIG. 6 is a flow diagram illustrating a method executing code instructions for an automated polarizer control system for controlling the adjustable, automated polarizer device among a plurality of polarizer rotation orientations for anti-reflection of a user's face in images from the webcam according to an embodiment of the present disclosure.

FIG. 6 is a flow diagram illustrating a method 600 of executing code instructions for an automated polarizer control system for controlling the adjustable, automated polarizer device among a plurality of polarizer rotation orientations of a rotatable polarizer for anti-reflection of a user's face in images from the webcam according to an embodiment of the present disclosure. As described herein, this method is directed to the operation of the adjustable, automated polarizer device described herein in connection with, for example, FIGS. 2A through 4.

The method 600 may include initializing the web camera and information handling system at block 605. In an embodiment, the initialization of the information handling system may include a user actuating a power button or switch to cause power to be provided to, at least, the information handling system. Initiation of the webcam may occur via a user actuating a power button or selecting a setting within a settings menu of an operating system of the information handling system in some embodiments. In other embodiments, initiation of a software application at the information handling system, such as a videoconferencing application, may invoke or initiate the webcam in other embodiments.

At block 610, the method 600 includes executing code instructions of trained face recognition firmware portion of executable code instructions of an automated polarizer control module with a webcam microcontroller, such as a digital signal processing microcontroller or other hardware processing resource, at a webcam. Upon initiation of the webcam at block 605, the webcam will capture images via a digital image sensor from an aperture of the webcam camera.

Proceeding to decision block 615, the method 600 includes the executing code instructions of trained face recognition firmware portion of executable code instructions of the automated polarizer control module with a webcam microcontroller to scan the captured images to detect whether a user's face or user's head is detected. If no face or head is detected at block 615, the flow returns to block 610 for the trained face recognition firmware portion of the automated polarizer control module to continue to monitor capture images by the webcam for a face or head of a user. If a face or head is detected at block 615, then the method 600 proceeds to block 620.

At block 620, execution of code instructions of the trained face recognition firmware portion of executable code instructions of the automated polarizer control system detects one of a plurality of face angles for the face or head detected in the capture image from the webcam camera. The trained face recognition firmware portion of executable code instructions of the automated polarizer control module may include a trained artificial intelligence algorithm that may detect one or more face landmarks and relative distances or ratios of distances between those landmarks in one or more sampled captured images. This artificial intelligence algorithm may be a trained classifier, such as a multi-level classifier which may first identify the plurality of face landmarks on a detected user's face of the captured image. Face landmarks that may be trained to be identified may include, for example, locations of eyes, eyebrows, cheeks, nose, chin, ears or other facial landmarks that may be detected in the image of a user's face or head. The artificial intelligence algorithm of the face recognition firmware may be trained offsite for face landmarks in a captured image of a face or head and stored as firmware at a webcam memory of the webcam.

Further, the execution of code instructions of the automated polarizer control system, including the face recognition firmware, may scan captured images and determine relative distances among plural face landmarks and ratios among those distances as within a captured image to determine a face angle or a head angle of a user's image appearing in the captured image. Other algorithms for head or face angle are also contemplated. Execution of the trained face recognition firmware or other algorithm of the face recognition firmware in executable code instructions of the automated polarizer control system by the webcam microcontroller may then determine the range of face angles or head angles, such as relative to a centerline, to determine where the determined face angle from the captured image falls. Plural ranges of a face angle may include a left facing angle range, a center facing angle range, or a right facing angle range in an example embodiment. In other embodiments, the execution of code instructions of the automated polarizer control system may determine from among any plurality of face angle ranges.

At block 625, execution of code instructions of the trained face recognition firmware portion of executable code instructions of the automated polarizer control system in an embodiment detects glasses, such as eyeglasses on a user that will generate a reflection or glare. In another embodiment, the automated polarizer control system may detect reflection or glare whether or not glasses are present in the captured image. This detection of glasses or presence of reflection or glare in a captured image may be a precondition to using the detected face angle or head angle to determine what polarizer rotation orientation is required of the rotatable polarizer in the adjustable, automated polarizer device in one optional embodiment. In other embodiments, this glasses or other glare detection may not be required.

The method 600 may proceed to 630 where the execution of code instructions of the automated polarizer control system by the webcam microcontroller has the head angle or face angle or a determined head angle range from the captured image of a user. The code instructions of the automated polarizer control system execute to determine a current polarizer rotation orientation of the rotatable polarizer for the adjustable, automated polarizer device as tracked by the code instructions of the automated polarizer control system during use of the webcam in embodiments herein. Execution of code instructions of the automated polarizer control system accesses an addressable database of correlation between the determined head or face angle and the polarizer rotation orientation of the rotatable polarizer in an embodiment. In one particular embodiment, the database may have a lookup table matrix of the head or face angles or face angle ranges and the polarizer rotation orientations that correlate based on preloaded data to determine polarizer rotation orientations that mitigate the reflection or glare of a user's head or face in a determined head or face angle or angle range within a captured image from the webcam.

At block 635, execution of code instructions of the automated polarizer control system has determined a polarizer rotation orientation that will mitigate reflection or glare and compares the same to the current tracked polarizer rotation orientation of the rotatable polarizer in the adjustable, automated polarizer device relative to the aperture of the webcam camera. The automated polarizer control system determines any adjustment, if any, needed to the polarizer rotation orientation of the rotatable polarizer to mitigate reflection or glare. Then a command is generated by the automated polarizer control system if adjustment is warranted or no command is generated if the current polarizer rotation orientation is sufficient to mitigate the reflection or glare in embodiments herein.

Proceeding to block 640, when a command is generated to adjust the polarizer rotation orientation of the rotatable polarizer by execution of code instructions of the automated polarizer control system at the webcam microcontroller, the webcam microcontroller may engage the stepper motor of the adjustable, automated polarizer device to rotate the gear polarizer ring and the rotatable polarizer to a new, corrected polarizer rotation orientation according to embodiments herein. The stepper motor may be stepped or driven by the webcam microcontroller and a power source to rotate a stepper motor gear, engage an idle gear, clutch and drive gear of a drive gear set to engage the teeth of the gear polarizer ring at a circumference and rotate the gear polarizer ring to a polarizer rotation orientation that was determined above in an embodiment. When no change in polarizer rotation orientation is determined to be necessary above, step 640 may not occur in an embodiment.

At block 645, the execution of code instructions of the trained face recognition firmware portion of executable code instructions of the automated polarizer control system will continue with periodic or sampled detection of the head or face angles from captured images, such as from captured frames of a video stream from the webcam usage in an embodiment. In various embodiments herein, detection of a face or head angle may occur for any sample period of time or number of frames of captured images and may also be checked at any frequency of sampling. Thus, the execution of code instructions of the trained face recognition firmware portion of executable code instructions of the automated polarizer control system will monitor during any period and any sample frequency the face and determined face or head angles or determined face or head angle ranges according to embodiments herein.

Proceeding to decision block 650, execution of code instructions of the trained face recognition firmware portion of executable code instructions of the automated polarizer control system will determine if the face or head angle has changed in an embodiment. In a particular example embodiment, the execution of code instructions of the trained face recognition firmware portion of executable code instructions of the automated polarizer control system will determine from periodic monitoring of the head or face angle whether the head or face angle has changed such that it falls in to a different or new head or face angle range requiring possible adjustment to the polarizer rotation orientation of the rotatable polarizer. If the head or face angle has not changed sufficiently to fall into another head or face angle range at block 650, then the flow returns to block 645 to continue periodic monitoring of the head or face angles. If the head or face angle has changed sufficiently to fall into another head or face angle range at block 650, then the flow proceeds to block 655.

At block 655, execution of code instructions of the automated polarizer control system by the webcam microcontroller uses the changed head angle or face angle or a determined head angle range from the captured image of a user at blocks 645 and 650 to determine a next polarizer rotation orientation. The automated polarizer control system will determine the current position of the rotatable polarizer for the adjustable, automated polarizer device as tracked by the code instructions of the automated polarizer control system during use of the webcam in embodiments herein. Execution of code instructions of the automated polarizer control system again accesses the addressable database of correlation between the determined head or face angle and the polarizer rotation orientation of the rotatable polarizer in an embodiment. In one embodiment, the database may have a lookup table matrix of the head or face angles or face angle ranges and the polarizer rotation orientations that correlate based on preloaded data to determine polarizer rotation orientations that mitigate the reflection or glare of a user's head or face in a determined head or face angle or angle range within a captured image from the webcam.

Proceeding to block 660, if the polarizer rotation orientation is to be adjusted, as before a command is generated to adjust the polarizer rotation orientation of the rotatable polarizer by execution of code instructions of the automated polarizer control system at the webcam microcontroller, the webcam microcontroller may engage the stepper motor of the adjustable, automated polarizer device to rotate the gear polarizer ring and the rotatable polarizer to a new, corrected polarizer rotation orientation according to embodiments herein. The stepper motor may be stepped or driven by the webcam microcontroller and a power source to rotate a stepper motor gear, engage an idle gear, clutch and drive gear of a drive gear set to engage the teeth of the gear polarizer ring at a circumference and rotate the gear polarizer ring to a polarizer rotation orientation that was determined above in an embodiment. When no change in polarizer rotation orientation is determined to be necessary above, step 660 may not occur in an embodiment. At this point in method 600, execution of code instructions of the trained face recognition firmware portion of executable code instructions of the automated polarizer control system by the webcam microcontroller will continue with periodic or sampled detection of the head or face angles from captured images and real time adjustments to the polarizer rotation orientation of the rotatable polarizer in the adjustable, automated polarizer device as needed until the webcam is shut down.

At block 665, the method 600 includes determining whether the webcam is still initiated and if it has been shut down properly with the tracking of the current polarizer rotation orientation as accurate or recorded. Where the wireless mouse is not still initiated but has not been turned off properly to record an accurate current polarizer rotation orientation, the method 600 proceeds to block 670 to perform the methods to reset the tracked current polarizer rotation orientation as described below. Where the wireless mouse is no longer initiated but the last current polarizer rotation orientation was recorded, the method proceeds to block 675. At block 675 the last current polarizer rotation orientation is recorded by the automated polarizer control system and stored in a webcam memory and the polarizer rotation orientation tracking reset is not needed. At this point, the method 600 may end.

Returning to block 670, the execution of code instructions for the automated polarizer control system will perform a reset of the polarizer rotation orientation tracking in an embodiment. Execution of code instructions for the automated polarizer control system will determine that the webcam was not shut down properly and the webcam microcontroller will generate a command to drive the stepper motor such that the gear polarizer ring is rotated to a rotation stop or maximum rotation in an embodiment. At this rotation stop position, the clutch in the drive gear of the adjustable, automated polarizer device will slip and this is detected by the stepper motor which will automatically rotate and reset the gear drive ring to an second rotation stop point. For example, the reset may set the gear drive ring to the second rotation stop point which may represent the 0 degree orientation for the rotatable polarizer. Upon startup of the webcam next time, the webcam microcontroller will automatically adopt the reset polarizer rotation orientation, such as 0 degrees, as the current polarizer rotation orientation. At this point, the method 600 may end.

The blocks of the flow diagrams of FIG. 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A webcam comprising:

a webcam microcontroller, a memory device, and a webcam camera to capture images of a user's face;

an adjustable, automated polarizer device having a stepper motor and a rotatable polarizer in a gear polarizer ring operatively coupled by a drive gear and arranged in front of an aperture for the webcam camera, where the rotatable polarizer in the gear polarizer ring is rotatable to adjust a polarizer rotation orientation to reduce reflection in images captured by the webcam camera; and the webcam microcontroller to execute computer-readable program code of an automated polarizer control system to adjust the rotation of the rotatable polarizer with the stepper motor based on a detected head angle of the user's face in the images captured by the webcam camera to reduce reflection in the images.

2. The webcam of claim 1 further comprising:

the gear polarizer ring to include a series of teeth around a portion of the external circumference of the gear polarizer ring to engage with the drive gear to rotate the gear polarizer ring and the rotatable polarizer to adjust the polarizer rotation orientation with respect to the aperture of the webcam camera.

3. The webcam of claim 2, wherein the rotatable polarizer is mounted inside of the polarizer ring and across the front opening of the aperture of the webcam camera.

4. The webcam of claim 1 further comprising:

the webcam microcontroller to execute the computer-readable program code of the automated polarizer control system to detect the user's face within the image captured by the webcam camera and determine face angles for left, straight, and right from face landmarks to generate a command to adjust the polarizer rotation orientation of the rotatable polarizer with the stepper motor based on the detected head angle of the user's face in the images captured by the webcam camera.

5. The webcam of claim 1 further comprising:

the webcam microcontroller to execute the computer-readable program code of the automated polarizer control system to detect glasses within the image captured by the webcam camera and then to determine face angles from face landmarks to generate a command to adjust the polarizer rotation orientation of the rotatable polarizer with the stepper motor based on the detected head angle of the user's face in the images captured by the webcam camera.

6. The webcam of claim 1 further comprising:

the webcam microcontroller to execute the computer-readable program code of the automated polarizer control system to determine the detected head angle of the user's face in the images captured by the webcam camera, to determine a current polarizer rotation orientation of the rotatable polarizer, and reference a polarizer position lookup table to determine whether to adjust the polarizer rotation orientation of the rotatable polarizer based on the detected head angle of the user's face in the images to reduce reflection in the images.

7. The webcam of claim 6 further comprising:

the webcam microcontroller to execute the computer-readable program code of the automated polarizer control system to determine that the current polarizer rotation orientation of the rotatable polarizer does not reduce the reflection at the detected head angle of the user's face in the images from the polarizer position lookup table and to generate a command adjust the current polarizer rotation orientation of the rotatable polarizer to a new polarizer rotation orientation indicated in the polarizer position lookup table.

8. A method of executing computer-readable program code of an automated polarizer control system for a webcam comprising:

executing the computer-readable program code of the automated polarizer control system, via a webcam microcontroller, to detect a user's face in images captured by a webcam camera and to detect a face angle from face landmarks of the user's face in the images;

executing the computer-readable program code of the automated polarizer control system to determine from the face angle if reflection is occurring from the user's face based on a current rotation angle of a rotatable polarizer in a gear polarizer ring of an adjustable, automated polarizer device having the rotatable polarizer disposed in front of an aperture of the webcam camera and based on the face angle detected; and executing the computer-readable program code of the automated polarizer control system to generate a command to adjust a rotation of the rotatable polarizer with a stepper motor of the adjustable, automated polarizer device operatively coupled to the gear polarizer ring when the detected face angle of the user's face is determined to generate a reflection in the images captured by the webcam camera to reduce the reflection in the images.

9. The method of claim 8, further comprising:

rotating the gear polarizer ring and the rotatable polarizer of the adjustable, automated polarizer device with the stepper motor rotating a drive gear operatively coupled to engage teeth disposed around a portion of a circumference of the gear polarizer ring to change the polarizer rotation orientation with respect to the aperture of the webcam camera.

10. The method of claim 8, wherein executing the computer-readable program code of the automated polarizer control system to detect the user's face in the images captured by the webcam camera and to detect the face angle includes detecting face angles for left, straight, and right face angles to determine the polarizer rotation orientation with respect to the aperture of the webcam camera to mitigate the reflection in the images captured by the webcam camera.

11. The method of claim 8, wherein the rotatable polarizer is mounted inside of the gear polarizer ring and is rotatable and disposed across the front opening of the aperture of the webcam camera and a second, static polarizer is mounted and disposed across the front opening of the aperture of the webcam camera adjacent to the rotatable polarizer for mitigation of the reflection in the images captured by the webcam camera.

12. The method of claim 8, further comprising:

executing the computer-readable program code of the automated polarizer control system to detect glasses on the user's face in the images captured by the webcam camera and to detect the face angle of the user's face.

13. The method of claim 8, further comprising:

detecting slippage in a clutch in a drive gear set that the stepper motor detects when the gear polarizer ring reaches a rotation stop; and executing the computer-readable program code of the automated polarizer control system at the webcam microcontroller to determine a minimum or maximum polarizer rotation orientation has been reached to reset tracking of the polarizer rotation orientation.

14. A webcam operatively coupled to an information handling system comprising:

a webcam microcontroller, a memory device, and a webcam camera to capture images of a user's face;

an adjustable, automated polarizer device having a stepper motor and a rotatable polarizer in a gear polarizer ring arranged in front of an aperture for the webcam camera;

the gear polarizer ring operatively coupled to the stepper motor via a drive gear set having a clutch and plural gears;

the gear polarizer ring includes teeth and a stopper shelf around a portion of a circumference of the gear polarizer ring where the teeth are operatively coupled to the drive gear set to rotate a polarizer rotation orientation of the rotatable polarizer with respect to the aperture of the webcam camera and the stopper shelf engages an exterior holder ring having a rotation stop to trigger a clutch reset of the angle of the gear polarizer ring; and the webcam microcontroller to execute computer-readable program code of an automated polarizer control system to adjust the rotation of the polarizer rotation orientation of the rotatable polarizer with the stepper motor to mitigate reflection in the images captured by the webcam camera.

15. The webcam of claim 14 further comprising:

the webcam microcontroller to execute the computer-readable program code of the automated polarizer control system to detect head angle of the user's face from face landmarks in the images captured by the webcam camera and to adjust the rotation of the polarizer rotation orientation for the rotatable polarizer with the stepper motor based on the detected head angle of the user's face in the images and determination of a current polarizer rotation orientation of the rotatable polarizer to reduce the reflection in the images captured by the webcam camera.

16. The webcam of claim 14 further comprising:

the drive gear set includes an idle gear, the clutch and a drive gear to operatively couple a stepper motor gear on the stepper motor to the teeth of the gear polarizer ring.

17. The webcam of claim 14, wherein the clutch allows slippage such that the stepper motor detects that the gear polarizer ring reaches the rotation stop and the execution of the computer-readable program code of the automated polarizer control system at the webcam microcontroller may determine a minimum or maximum polarizer rotation orientation has been reached to reset tracking of the polarizer rotation orientation.

18. The webcam of claim 14 further comprising:

the webcam microcontroller to execute the computer-readable program code of the automated polarizer control system to detect head angle of the user's face within the image captured by the webcam camera and determine head angles for left, straight, and right angles from face landmarks to generate a command to adjust the polarizer rotation orientation of the rotatable polarizer with the stepper motor based on the detected head angle of the user's face in the images captured by the webcam camera and based on a current polarizer rotation orientation of the polarizer.

19. The webcam of claim 14 further comprising:

the webcam microcontroller to execute the computer-readable program code of the automated polarizer control system to detect glasses worn by a user within the image captured by the webcam camera and then to determine head angle of the user's face from face landmarks to generate a command to adjust the polarizer rotation orientation of the rotatable polarizer with the stepper motor based on the head angle of the user's face in the images captured by the webcam camera if a current polarizer rotation orientation of the rotatable polarizer does not mitigate the reflection in the images captured by the webcam camera.

20. The webcam of claim 14 further comprising:

a second, static polarizer arranged in front of an aperture for the webcam camera adjacent to the rotatable polarizer of the adjustable, automated polarizer device to mitigate the reflection in the images captured by the webcam camera.

* * * * *